(12) United States Patent
Yoo et al.

(10) Patent No.: US 12,275,647 B2
(45) Date of Patent: Apr. 15, 2025

(54) COMPOSITE INCLUDING LITHIUM-VANADIUM OXIDE AND CARBON NANOTUBES, METHOD FOR PRODUCING THE SAME AND ENERGY STORAGE DEVICE INCLUDING THE SAME

(71) Applicant: KOREA INSTITUTE OF ENERGY RESEARCH, Daejeon (KR)

(72) Inventors: Jung Joon Yoo, Daejeon (KR); Sang Hui Kang, Daejeon (KR); Jeong Hun Baek, Daejeon (KR); Bum Jin Kim, Daejeon (KR); Kang Jick Kim, Daejeon (KR); Tae Hyeong Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 217 days.

(21) Appl. No.: 17/827,192

(22) Filed: May 27, 2022

(65) Prior Publication Data
US 2023/0295002 A1    Sep. 21, 2023

(30) Foreign Application Priority Data
Mar. 16, 2022    (KR) .......................... 10-2022-0032460

(51) Int. Cl.
*C01G 31/02*    (2006.01)
*B01J 6/00*    (2006.01)
*C01B 32/158*    (2017.01)

(52) U.S. Cl.
CPC .............. *C01G 31/02* (2013.01); *B01J 6/001* (2013.01); *C01B 32/158* (2017.08); *C01P 2004/13* (2013.01); *C01P 2006/12* (2013.01); *C01P 2006/16* (2013.01)

(58) Field of Classification Search
CPC ......... C01G 31/02; C01B 32/158; B01J 6/001
See application file for complete search history.

(56) References Cited

U.S. PATENT DOCUMENTS

2020/0168912 A1* 5/2020 Kubota ................. H01M 4/366

OTHER PUBLICATIONS

Iwama et al., "Enhanced Electrochemical Performance of Ultracentrifugation-Derived nc-$Li_3VO_4$/MWCNT Composites for Hybrid Supercapacitors," ACS Nano, 2016, total 7 pages.

(Continued)

*Primary Examiner* — James A Fiorito
(74) *Attorney, Agent, or Firm* — Birch, Stewart, Kolasch & Birch, LLP

(57) ABSTRACT

The present invention may provide a nano-sized composite having excellent electrical conductivity and specific surface area. The present invention may provide a method of producing the above-described composite through a simple process without an ultracentrifugation process or a flash annealing step. The present invention may provide an energy storage device having high power performance and having excellent specific capacity characteristics not only at low current density but also at high current density.

9 Claims, 7 Drawing Sheets

(56) References Cited

OTHER PUBLICATIONS

Jian et al., "$Li_3VO_4$ anchored graphene nanosheets for long-life and high-rate lithium-ion batteries," The Royal Society of Chemistry, ChemComm, Nov. 5, 2014, total 3 pages.

Liang et al., "New understanding of $Li_3VO_4$/C as potential anode for Li-ion batteries: Preparation, structure characterization and lithium insertion mechanism," Journal of Power Sources, vol. 274, 2015, pp. 345-354.

Qin et al., "One-pot synthesis of $Li_3VO_4$@C nanofibers by electrospinning with enhanced electrochemical performance for lithium-ion batteries," Science Bulletin, Jun. 20, 2017, pp. 1-21 (total 22 pages).

Shao et al., "Enhancing the performance of $Li_3VO_4$ by combining nanotechnology and surface carbon coating for lithium ion batteries," Journal of Materials Chemistry A, Apr. 20, 2015, pp. 1-7 (total 8 pages).

Yang et al., "Morphology Controlled Lithium Storage in $Li_3VO_4$ Anode," Journal of Materials Chemistry A, Nov. 27, 2017, pp. 1-9 (total 10 pages).

Yang et al., "Spray Drying-Assisted Synthesis of $Li_3VO_4$/C/CNTs Composites for High-Performance Lithium Ion Battery Anodes," Journal of The Electrochemical Society, vol. 164, No. 1, 2017, pp. A6001-A6006.

Korean Office Action for Korean Application No. 10-2022-0032460, dated Sep. 11, 2024, with an English translation.

\* cited by examiner

[FIG. 1]
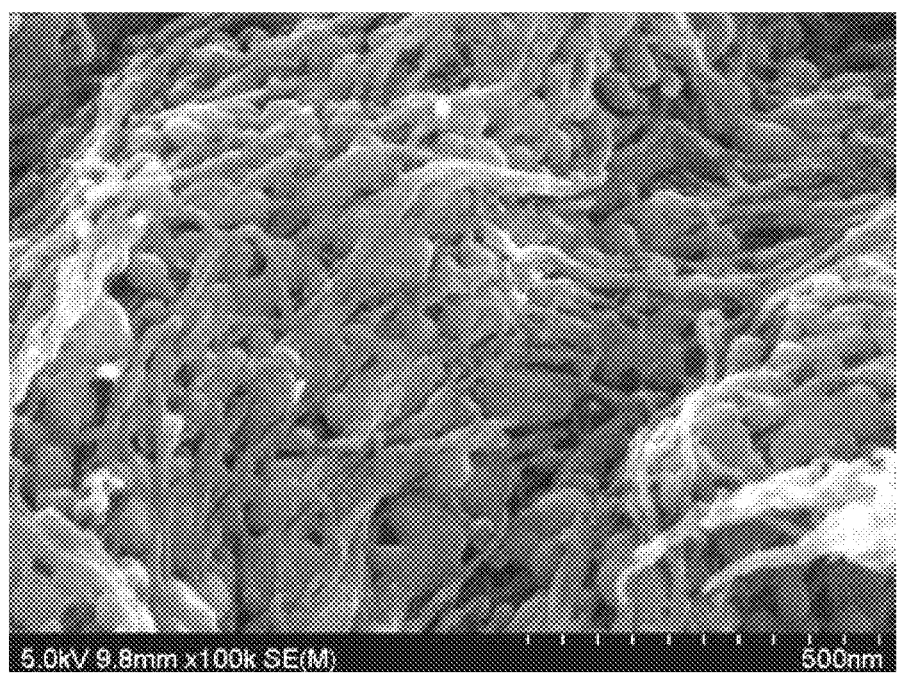

[FIG. 2]
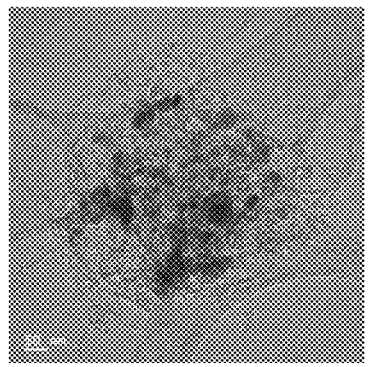 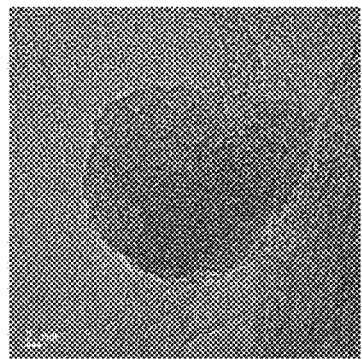 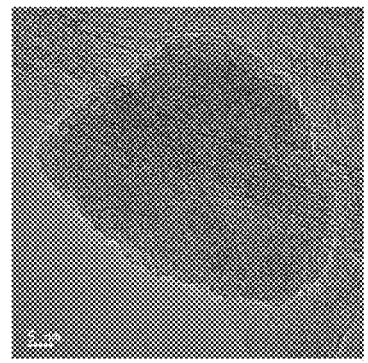

[FIG. 3]
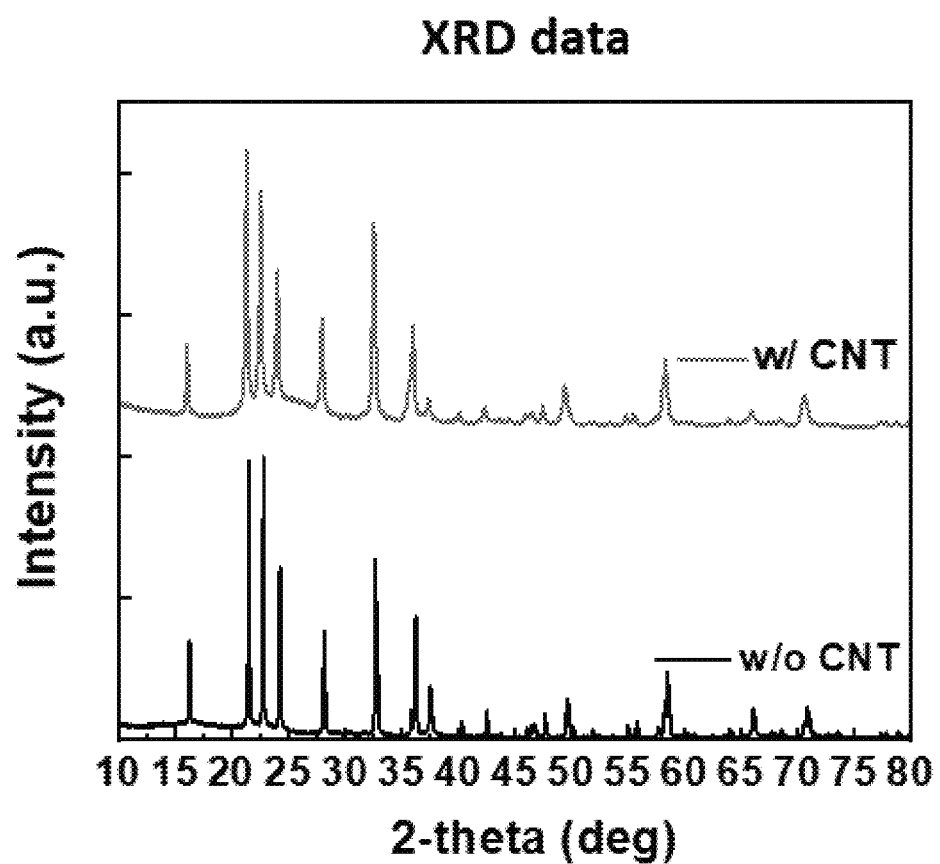

[FIG. 4]
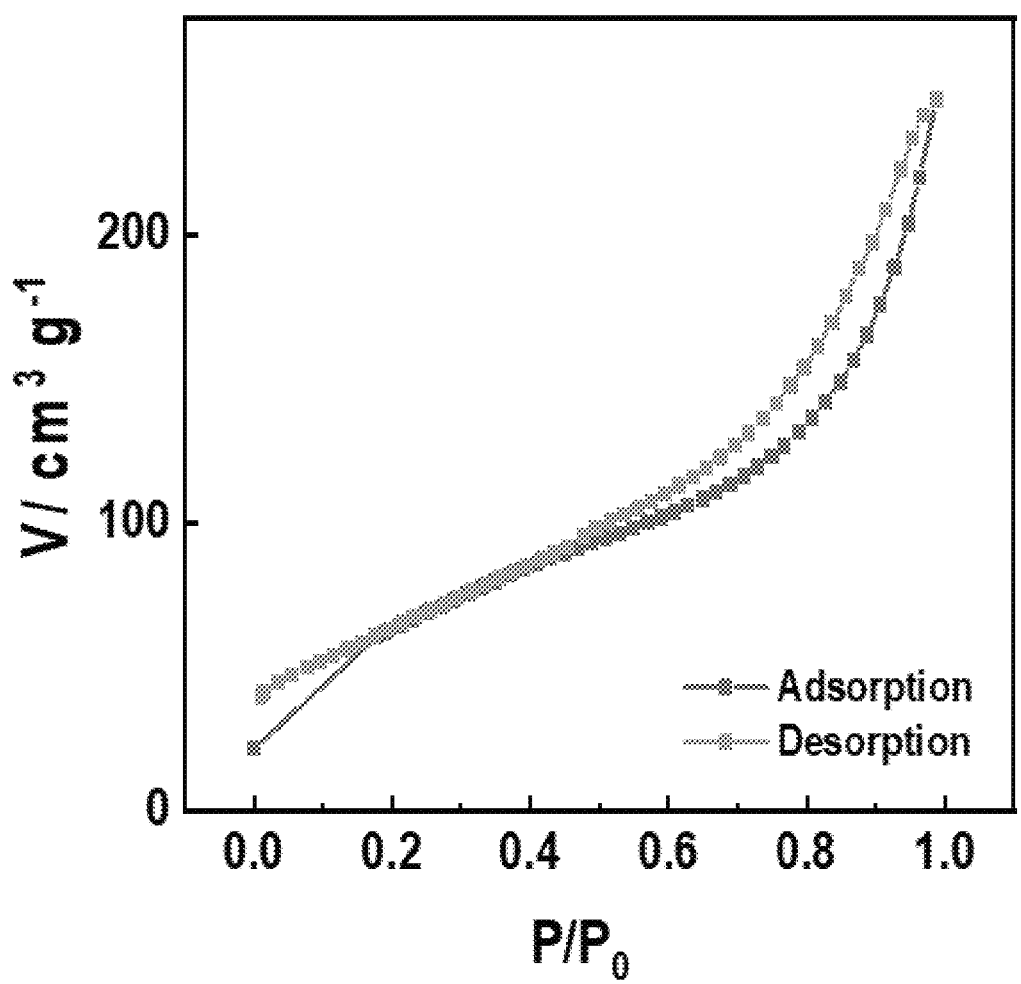

[FIG. 5]
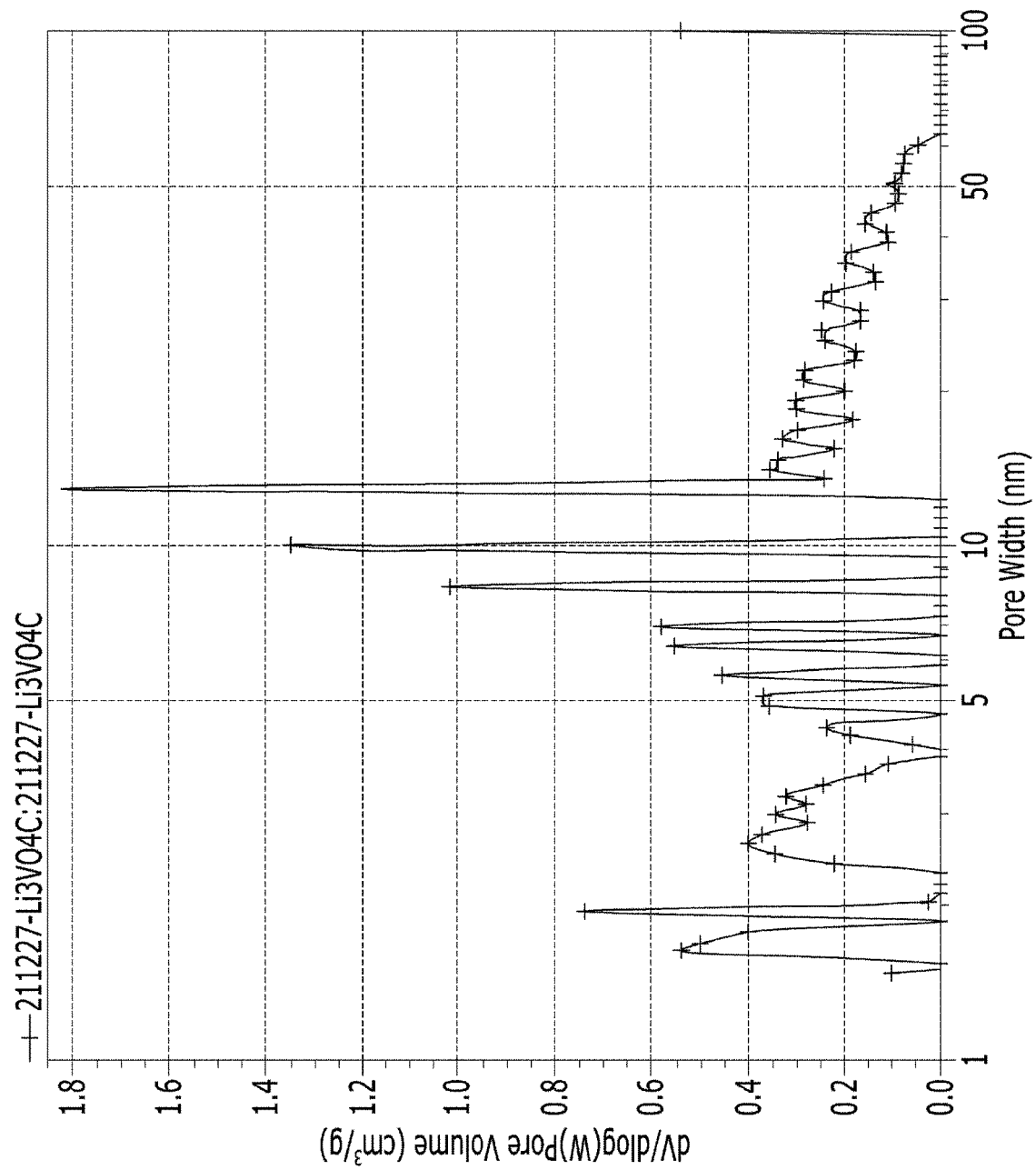

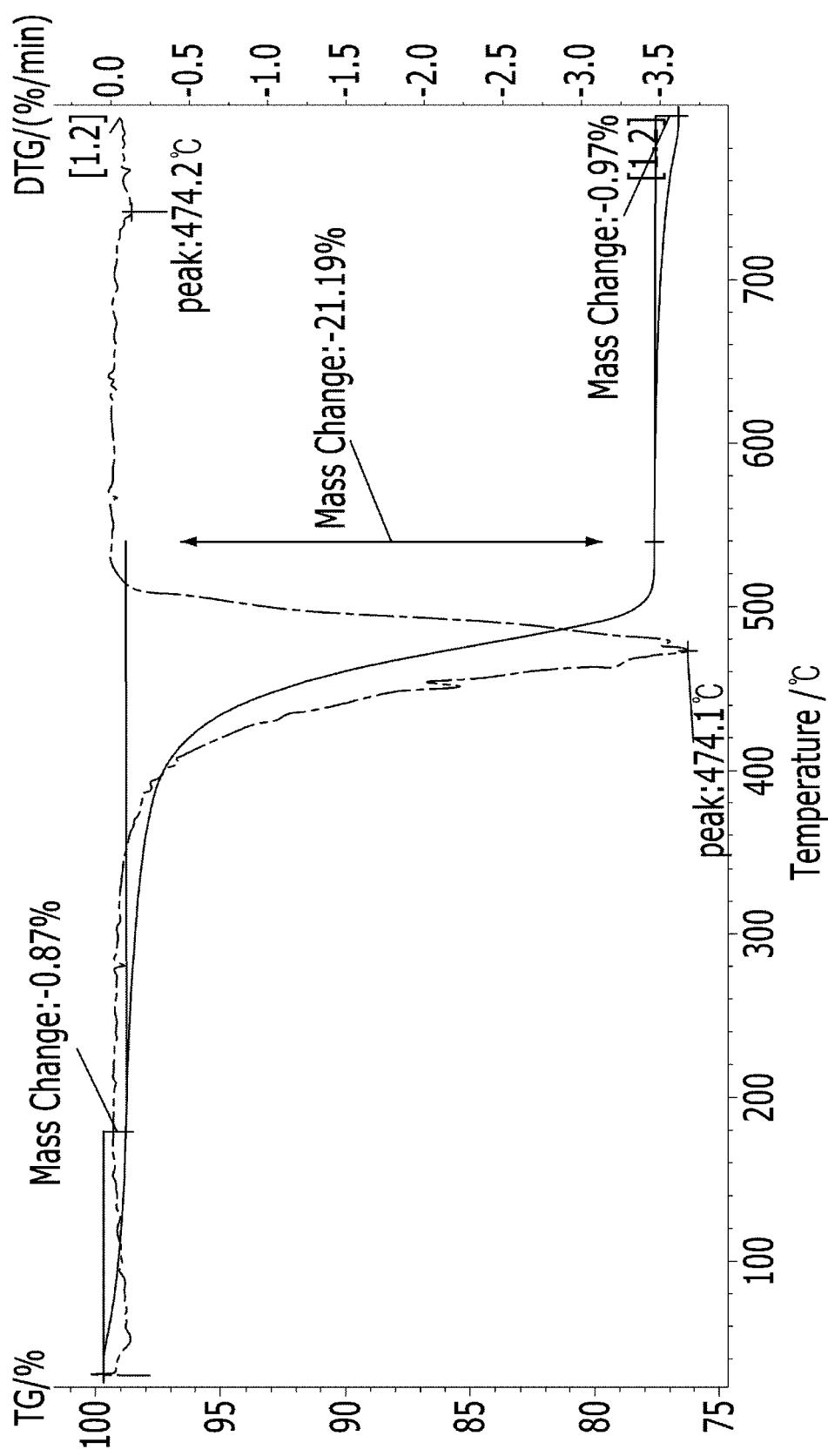
[FIG. 6]

[FIG. 7]
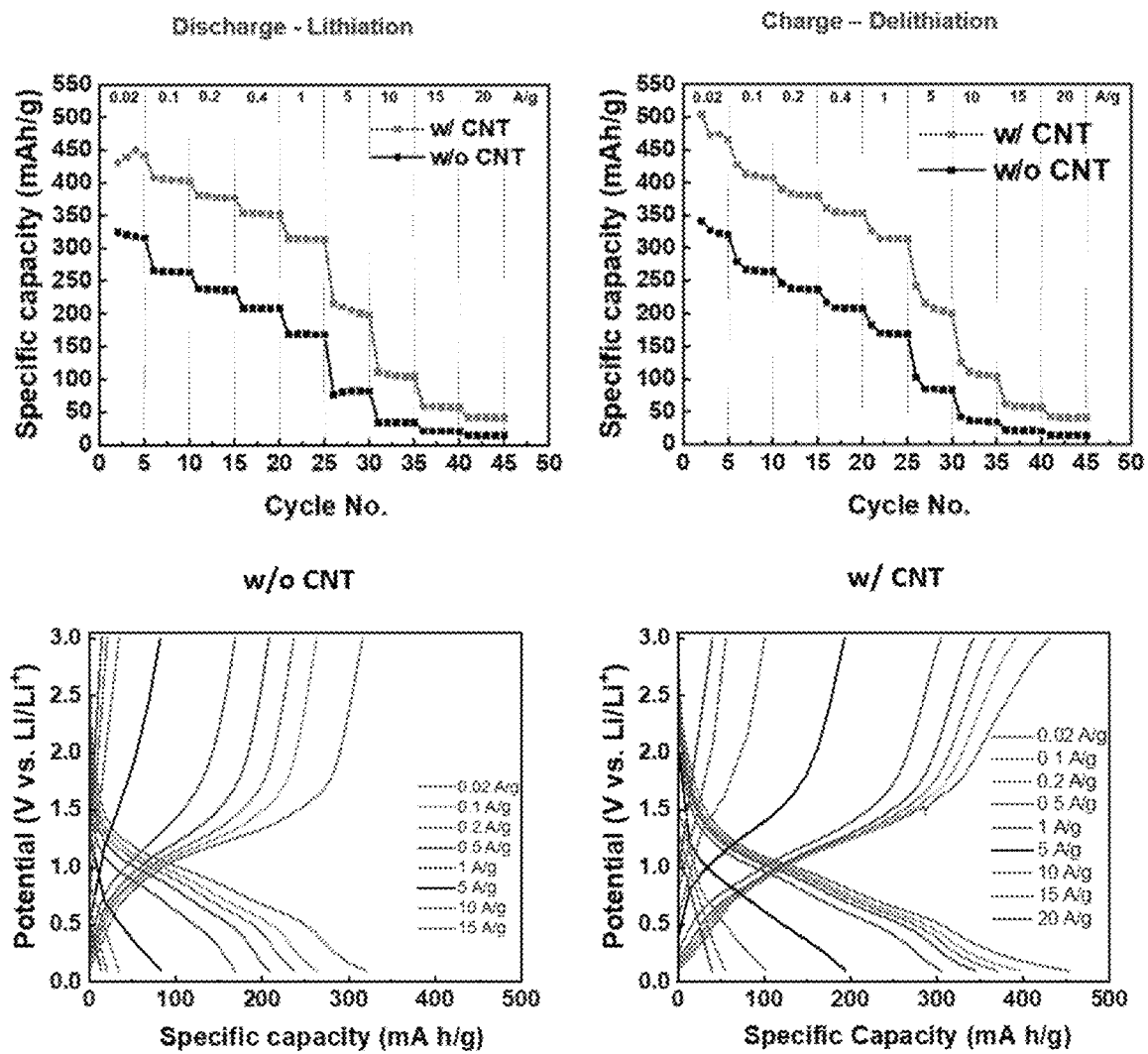

COMPOSITE INCLUDING LITHIUM-VANADIUM OXIDE AND CARBON NANOTUBES, METHOD FOR PRODUCING THE SAME AND ENERGY STORAGE DEVICE INCLUDING THE SAME

CROSS REFERENCE TO RELATED APPLICATIONS

This non-provisional application claims the benefit under 35 U.S.C. § 119 (a) to Korean Patent Application No. 10-2022-0032460, filed in the Republic of Korea on Mar. 16, 2022, which is hereby expressly incorporated by reference in its entirety.

BACKGROUND

1. Technical Field

The present invention relates to a composite including lithium-vanadium oxide and carbon nanotubes, a method for producing the same, and an energy storage device including the same.

2. Related Art

Conventional $Li_3VO_4$ undergoes Li intercalation at a low voltage and shows a capacity of 394 mAh/g. However, $Li_3VO_4$ has a low electrical conductivity of $10^{-10}$ S/m or less, and thus hardly exhibits high power performance.

In order to overcome this limitation, a method of using a composite of $Li_3VO_4$ and amorphous carbon or carbon nanotubes as an anode active material was proposed.

As an example, Prior Art Document 1 (ACS Nano, American Chemical Society, 2016, vol. 10 (n° 5), pp. 5398-5404) proposes a composite produced through an ultracentrifugation process and including nanocrystalline $Li_3VO_4$ dispersed on multi-walled carbon nanotubes. The composite proposed in Prior Art Document 1 reached a specific capacity of 330 mAh/g at an average voltage of 1 V (vs Li), and exhibited a capacity retention of 50% or more at a high current density of 20 A/g.

However, Prior Art 1 discloses that an ultracentrifugation process is essential to ensure that nanocrystalline $Li_3VO_4$ is highly dispersed on the multi-walled carbon nanotubes, and also discloses that a flash annealing step is essentially required to prevent agglomeration between powders.

This ultracentrifugation process or flash annealing step complicates the production process, increases the production cost, and reduces productivity and yield.

Therefore, there is a need to provide a composite having excellent electrochemical properties while solving these problems.

SUMMARY

An object of the present invention is to provide a nano-sized composite having excellent electrical conductivity and specific surface area.

Another object of the present invention is to provide a method for producing the above-described composite through a simple process without an ultracentrifugation process or a flash annealing step.

Still another object of the present invention is to provide an energy storage device having high power performance and having excellent specific capacity characteristics not only at low current density but also at high current density.

Objects to be achieved by the present invention are not limited to the objects mentioned above, and other objects not mentioned herein will be clearly understood by those of ordinary skill in the art to which the present invention pertains from the following description.

One aspect of the present invention is directed to a composite.

In one embodiment, the composite of the present invention may include lithium-vanadium oxide and carbon nanotubes and have a specific surface area (BET analysis) ranging from 50 to 500 $m^2/g$.

In one embodiment, the composite of the present invention may have an average pore size ranging from 1 nm to 100 nm.

In one embodiment, the lithium-vanadium oxide in the composite of the present invention may have an average particle diameter of 500 nm or less.

In one embodiment, the composite of the present invention may further include amorphous carbon.

In one embodiment, the carbon nanotube in the composite of the present invention may have a specific surface area (BET analysis) ranging from 100 to 1,000 $m^2/g$.

In one embodiment, the carbon nanotube in the composite of the present invention may have a diameter ranging from 1 to 50 nm.

In one embodiment, the carbon nanotube in the composite of the present invention may have a length ranging from 10 to 1,500 μm.

In one embodiment, the composite may include the lithium-vanadium oxide in an amount of 5 wt % or more based on the total weight of the composite.

Another aspect of the present invention is directed to a method for producing a composite.

In one embodiment, the method for producing a composite according to the present invention may be performed without an ultracentrifugation step or a flash annealing step, and may include: a step of preparing powder by mixing lithium-vanadium oxide and carbon nanotubes; a step of calcining the powder; and/or a step of annealing the calcined powder.

In one embodiment, the method for producing a composite according to the present invention may not include the ultracentrifugation step or the flash annealing step.

In one embodiment, in the method for producing a composite according to the present invention, the step of calcining powder may be performed at a temperature ranging from 100° C. to 700° C. for 1 hour to 7 hours.

In one embodiment, in the method for producing a composite according to the present invention, the step of annealing the powder may be performed at a temperature ranging from 500° C. to 1,500° C. for 10 minutes to 300 minutes.

In one embodiment, in the method for producing a composite according to the present invention, the lithium-vanadium oxide may have an average particle diameter of 500 nm or less.

Still another aspect of the present invention is directed to an energy storage device.

In one embodiment, the energy storage device of the present invention may include the above-described composite.

BRIEF DESCRIPTION OF THE DRAWINGS

FIG. 1 shows an SEM image of an LVO/C/CNT composite.

FIG. 2 shows TEM images of an LVO/C/CNT composite.

FIG. 3 is a graph showing the XRD data of an LVO/C/CNT composite and an LVO/C composite.

FIG. 4 is a graph showing the $N_2$ adsorption-desorption isotherms of an LVO/C/CNT composite.

FIG. 5 is a graph showing the pore size distribution of an LVO/C/CNT composite.

FIG. 6 is a graph showing the results of thermogravimetric analysis of an LVO/C/CNT composite.

FIG. 7 depicts graphs showing the results of evaluating the galvanostatic charge and discharge characteristics of an LVO/C/CNT composite and an LVO/C composite.

DETAILED DESCRIPTION

Among the physical properties mentioned in the present specification, the physical properties that vary depending on the temperature or pressure used in measurement are the results obtained by measurement at room temperature and/or atmospheric pressure, unless otherwise specified.

As used herein, the term "room temperature" refers to a natural temperature that has been neither increased nor decreased, for example, a temperature within 10° C. to 30° C., for example, about 23° C. or about 25° C. In addition, in the present specification, temperature is expressed in units of ° C. unless otherwise specified.

The term "atmospheric pressure" is a natural pressure that is not pressurized or decompressed, and usually means about 1 atmosphere of atmospheric pressure.

As used herein, the term "atmospheric pressure" refers to a natural pressure that has been neither increased nor decreased, and usually means about 1 atm.

Among the physical properties mentioned in the present specification, the physical properties that vary depending on the humidity used in measurement are physical properties measured at a non-controlled humidity under the above-mentioned room temperature and/or atmospheric pressure conditions, unless otherwise specified.

One aspect of the present invention is directed to a composite.

In one embodiment, the composite of the present invention may include lithium-vanadium oxide and carbon nanotubes. In one embodiment, the composite of the present invention may have a form in which the lithium-vanadium oxide is dispersed on the carbon nanotubes, as shown in FIG. 1.

In the present specification, the lithium-vanadium oxide may be, for example, a compound represented by Formula 1 below.

$$Li_aV_bO_c$$ [Formula 1]

wherein a may be an integer ranging, for example, from 1 to 10, b may be an integer of, for example, 5 or less, and c may be an integer ranging, for example, from 1 to 10. In another embodiment, a may be an integer ranging from 2 to 9, or an integer of 8 or less, 7 or less, 6 or less, 5 or less, or 4 or less, b may be an integer of 4 or less, 3 or less, or 2 or less, and c may be an integer of 2 or more, or 3 or more, or an integer of 9 or less, 8 or less, 7 or less, 6 or less, or 5 or less.

In the present specification, the carbon nanotubes may be, for example, multi-wall carbon nanotubes (MWCNTs) or single-wall carbon nanotubes (SWCNTs), preferably multi-wall carbon nanotubes in view of synthesis ease and/or costs.

In one embodiment, the specific surface area(BET analysis) of the carbon nanotube may be in the range of 100 to 1,000 $m^2/g$. In another embodiment, the specific surface area (BET analysis) of the carbon nanotube may be 150 $m^2/g$ or more, 200 $m^2/g$ or more, 250 $m^2/g$ or more, 300 $m^2/g$ or more, 350 $m^2/g$ or more, 400 $m^2/g$ or more, 450 $m^2/g$ or more, or 500 $m^2/g$ or more, or 950 $m^2/g$ or less, 900 $m^2/g$ or less, 850 $m^2/g$ or less, 800 $m^2/g$ or less, 750 $m^2/g$ or less, or 700 $m^2/g$ or less.

In one embodiment, the diameter of the carbon nanotube may be in the range of 1 to 50 nm. In another embodiment, the diameter of the carbon nanotube may be 2 nm or more, 3 nm or more, 4 nm or more, or 5 nm or more, or 45 nm or less, 40 nm or less, 35 nm or less, 30 nm or less, 25 nm or less, 20 nm or less, 18 nm or less, 16 nm or less, 14 nm or less, 12 nm or less, 10 nm or less, 9 nm or less, or 7 nm or less. According to the present invention, as the diameter of the carbon nanotube is controlled as described, it is possible to form a desired composite including lithium-vanadium oxide having a particle size to be described later.

In one embodiment, the length of the carbon nanotube may be in the range of 10 to 1,500 μm. In another embodiment, the length of the carbon nanotube may be 20 μm or more, 30 μm or more, 40 μm or more, or 50 μm or more, or 1,400 μm or less, 1,300 μm or less, 1,200 μm or less, 1,100 μm or less, 1,000 μm or less, 900 μm or less, 800 μm or less, 700 μm or less, 600 μm or less, 500 μm or less, 450 μm or less, 400 μm or less, 350 μm or less, 300 μm or less, 250 μm or less, 200 μm or less, or 150 μm or less. According to the present invention, as the length of the carbon nanotube is controlled as described above, it is possible to provide a composite having excellent specific surface area while overcoming electrical resistance resulting from introduction of the lithium-vanadium oxide.

As the composite of the present invention includes the carbon nanotubes having the above-described characteristics, it may provide a nano-sized composite having excellent electrical conductivity and/or specific surface area.

In one embodiment, the composition of the present invention may have a specific surface area (BET analysis) of 50 to 500 $m^2/g$. The specific surface area (BET analysis) of the composite may be measured, for example, according to an evaluation example to be described later. In another embodiment, the specific surface area (BET analysis) of the composite may be 100 $m^2/g$ or more, 150 $m^2/g$ or more, or 200 $m^2/g$ or more, or 450 $m^2/g$ or less, 400 $m^2/g$ or less, 350 $m^2/g$ or less, 300 $m^2/g$ or less, or 250 $m^2/g$ or less.

In one embodiment, the composite of the present invention may have an average pore size ranging from 1 nm to 100 nm. The average pore size of the composite may be measured, for example, according to an evaluation example to be described later. In another embodiment, the average pore size of the composite may be 2 nm or more, 3 nm or more, 4 nm or more, 5 nm or more, or 6 nm or more, or 90 nm or less, 80 nm or less, 70 nm or less, 60 nm or less, 50 nm or less, 40 nm or less, 30 nm or less, 20 nm or less, 18 nm or less, 16 nm or less, 14 nm or less, 12 nm or less, 10 nm or less, or 8 nm or less.

As the composite of the present invention has the above-described specific surface area(BET analysis) and/or pore distribution characteristics, it is possible to provide an energy storage device, which has high power performance and exhibits excellent specific capacity characteristics not only at low current density but also at high current density, even by a simple process.

In one embodiment, the average particle diameter of the lithium-vanadium oxide in the composite of the present invention may be 500 nm or less. The average particle diameter of the lithium-vanadium oxide may be measured, for example, according to an evaluation example to be described later. In another embodiment, the average particle diameter of the lithium-vanadium oxide in the composite of the present invention may be 450 nm or less, 400 nm or less, 350 nm or less, 300 nm or less, 250 nm or less, 200 nm or less, 150 nm or less, or 100 nm or less, or 10 nm or more, 20 nm or more, 30 nm or more, or 40 nm or more.

As the composite of the present invention includes the lithium-vanadium oxide having the above-described average particle diameter, it may provide a composite having excellent electrical conductivity while having high power performance.

In one embodiment, the composite of the present invention may further include amorphous carbon. In the composite of the present invention, the amorphous carbon may be a coating layer formed on the lithium-vanadium oxide. The amorphous carbon may be derived from, for example, a solvent to be described later.

As the composite of the present invention further includes the amorphous carbon as described above, a uniform and thin solid electrolyte interphase (SEI) layer may be formed on the electrode material surface, thereby providing a composite having increased coulombic efficiency, improved cycle life characteristics and further improved electrical conductivity.

In one embodiment, the composite of the present invention may include the lithium-vanadium oxide in an amount of 5 wt % or more based on the total weight of the composite. The composition of the composite of the present invention and/or the weight proportion of the lithium-vanadium oxide in the composite may be measured, for example, according to an evaluation example to be described later. In another embodiment, the composite of the present invention may include the lithium-vanadium oxide in an amount of 10 wt % or more, 15 wt % or more, 20 wt % or more, 25 wt % or more, 30 wt % or more, 35 wt % or more, 40 wt % or more, 45 wt % or more, 50 wt % or more, 55 wt % or more, 60 wt % or more, 65 wt % or more, 70 wt % or more, or 75 wt % or more, or 95 wt % or less, 90 wt % or less, 85 wt % or less, or 80 wt % or less, based on the total weight of the composite.

As the composite of the present invention includes the lithium-vanadium oxide in the above-described amount, it may provide an energy storage device having high power performance and specific capacity.

In one embodiment, the composite of the present invention may include carbon in an amount of 5 to 50 parts by weight based on 100 parts by weight of the lithium-vanadium oxide. As used herein, the term "carbon" may be meant to include, for example, the aforementioned carbon nanotubes and/or amorphous carbon. In another embodiment, the composite of the present invention may include carbon in an amount of 10 parts by weight or more, 15 parts by weight or more, 20 parts by weight or more, or 25 parts by weight or more, or 45 parts by weight or less, 40 parts by weight or less, 35 parts by weight or less, or 30 parts by weight or less, based on 100 parts by weight of the lithium-vanadium oxide.

Another aspect of the present invention is directed to a method for producing a composite. In the method for producing a composite according to the present invention, details regarding the composite may be the same as those described above.

In one embodiment, the method for producing a composite according to the present invention may be performed without an ultracentrifugation step or a flash annealing step, and may include: a step of preparing powder by mixing lithium-vanadium oxide and carbon nanotubes; a step of calcining the powder; and/or a step of annealing the calcined powder.

In one embodiment of the present invention, the step of preparing powder by mixing lithium-vanadium oxide and carbon nanotubes may include steps of: preparing a mixture by mixing a lithium-vanadium oxide precursor and carbon nanotubes together; and drying the mixture.

The lithium-vanadium oxide precursor may include, for example, a lithium compound, an ammonium compound, and/or an acidic compound. Examples of the lithium compound include lithium acetate, lithium hydroxide, lithium nitrate, lithium sulphate, lithium perchlorate, and lithium chloride (LiCl). Examples of the ammonium compound include ammonium carbonate, ammonium nitrate, ammonium fluoride, ammonium sulfate, ammonium sulfide, ammonium iodide, ammonium cyanate, ammonium bromide, ammonium chloride, and ammonium glutamate. Examples of the acidic compound include citric acid and oxalic acid.

In one embodiment, in the step of preparing a mixture by mixing a lithium-vanadium oxide precursor and carbon nanotubes together, the lithium compound may be used in an amount of 20 to 120 parts by weight based on 100 parts by weight of the ammonium compound. In another embodiment, in the step of preparing a mixture by mixing a lithium-vanadium oxide precursor and carbon nanotubes together, the lithium compound may be used in an amount of 30 parts by weight or more, 40 parts by weight or more, 50 parts by weight or more, or 60 parts by weight or more, or 110 parts by weight or less, 100 parts by weight or less, 90 parts by weight or less, 80 parts by weight or less, or 70 parts by weight or less, based on 100 parts by weight of the ammonium compound.

In one embodiment, in the step of preparing a mixture by mixing a lithium-vanadium oxide precursor and carbon nanotubes together, the acidic compound may be used in an amount of 100 to 300 parts by weight based on 100 parts by weight of the ammonium compound. In another embodiment, in the step of preparing a mixture by mixing a lithium-vanadium oxide precursor and carbon nanotubes together, the acidic compound may be used in an amount of 120 parts by weight or more, 140 parts by weight or more, or 160 parts by weight or more, or 280 parts by weight or less, 260 parts by weight or less, 240 parts by weight or less, 220 parts by weight or less, 200 parts by weight or less, or 180 parts by weight or less, based on 100 parts by weight of the ammonium compound.

The step of preparing a mixture by mixing a lithium-vanadium oxide precursor and carbon nanotubes together may be performed, for example, in a solvent. The solvent may be one or a mixture of two or more selected from the group consisting of glycol solvents, including ethylene glycol, diethylene glycol, triethylene glycol, tetraethylene glycol, polyethylene glycol, propylene glycol, dipropylene glycol, polypropylene glycol, hexylene glycol, and 1,2-hexadecanediol; and glycol ether solvents, including methyl glycol, butyl glycol, butyl triglycol, butyl polyglycol, hexyl glycol, hexyl diglycol, ethyl hexyl glycol, ethyl hexyl diglycol, aryl glycol, phenyl glycol, phenyl diglycol, benzyl glycol, methyl propylene glycol, methyl propylene diglycol, methyl propylene triglycol, propyl propylene glycol, propyl propylene diglycol, butyl propylene glycol, butyl propylene diglycol, phenyl propylene glycol, and methyl propylene glycol acetate.

In embodiment, the step of drying the mixture may be performed under vacuum at a temperature ranging from 80°

C. to 200° C. In another embodiment, the step of drying the mixture may be performed under vacuum at a temperature ranging from 90° C. to 180° C., from 100° C. to 150° C., or from 110° C. to 130° C. In one embodiment, the step of drying the mixture may be performed for 5 hours to 25 hours. In another embodiment, the step of drying the mixture may be performed for 7 hours to 20 hours, 9 hours to 15 hours, or 11 hours to 13 hours.

In one embodiment of the present invention, the step of calcining the powder may be performed at a temperature of 100° C. to 700° C. for 1 hour to 7 hours. In another embodiment of the present invention, the step of calcining the powder may be performed at a temperature of 150° C. or higher, 200° C. or higher, or 250° C. or higher, or 650° C. or lower, 600° C. or lower, 550° C. or lower, 500° C. or lower, 450° C. or lower, 400° C. or lower, or 350° C. or lower. In one embodiment of the present invention, the step of calcining the powder may be performed for 1 hour and 30 minutes or more, 2 hours or more, or 2 hours and 30 minutes or more, or 6 hours or less, 5 hours or less, or 4 hours or less. The calcining may be performed, for example, under an air atmosphere.

In one embodiment of the present invention, the step of annealing the calcined powder may be performed at a temperature of 500° C. to 1,500° C. for 10 minutes to 300 minutes. In another embodiment of the present invention, the step of annealing the calcined powder may be performed at a temperature of 550° C. or higher, 600° C. or higher, 650° C. or higher, 700° C. or higher, or 750° C. or higher, or 1,400° C. or lower, 1,300° C. or lower, 1,200° C. or lower, 1,100° C. or lower, 1,000° C. or lower, or 900° C. lower. In another embodiment of the present invention, the step of annealing the calcined powder may be performed for 15 minutes or more, 20 minutes or more, or 25 minutes or more, or 250 minutes or less, 200 minutes or less, 150 minutes or less, 100 minutes or less, 50 minutes or less, or 40 minutes or less. The annealing may be performed, for example, under an inert gas atmosphere. As used herein, the term "inert gas atmosphere" may mean that inert gas is contained in a concentration of, for example, 99% or more, 99.5% or more, or 99.9% or more. As the inert gas, nitrogen, argon or helium may be used.

The method for producing a composite according to the present invention may not include, for example, an ultracentrifugation process and/or a flash annealing step.

In a conventional process of preparing powder by mixing lithium-vanadium oxide and carbon nanotubes together, an ultracentrifugation step is essential because the lithium-vanadium oxide is nanometers in size and needs to be highly dispersed on carbon nanotubes. However, according to the method for preparing a composite according to the present invention, it is possible to provide a desired composite and an energy storage device including the same without the ultracentrifugation step.

Although the reason is not clearly understood, it is believed that the present invention may provide a larger reaction area between the carbon nanotubes and the lithium-vanadium oxide by combining the carbon nanotubes having the above-described characteristics and the lithium-vanadium oxide, thereby inducing simultaneous particle formation, thereby providing a more advantageous aspect in terms of particle formation rather than particle growth, and thus enables the formation of the lithium-vanadium oxide having the above-described average particle size and a high degree of dispersion of the lithium-vanadium oxide on the carbon nanotubes without the ultracentrifugation step. In addition, a flash annealing process is generally required to induce crystallization of the composite. However, the flash annealing step requires a additional heat treatment device because the crystallization should be induced even by 5 minutes or less of heat treatment. This additional heat treatment device has a disadvantage in terms of process ease or costs. When the flash annealing step is included, there are also disadvantages in that mass production is difficult and the yield is low. In this regard, the present inventors have conducted studies to overcome the above-described disadvantages, and as a result, have found that, when a combination of the above-described carbon nanotubes and lithium-vanadium oxide is used, a composite having the desired properties may be mass-produced in high yield even when the method of the present invention includes only the above-described annealing step without the above-described flash annealing step.

The method for producing a composite according to the present invention may provide a nano-sized composite having excellent electrical conductivity and/or specific surface area even through a simple process without the above-described ultracentrifugation process and/or flash annealing step, thereby providing an energy storage device having high power performance and having excellent specific capacity characteristics not only at low current density but also at high current density.

Another aspect of the present invention is directed to an energy storage device.

In one embodiment, the energy storage device may include the composite. Details on the composite may be the same as those described above with respect to the composite and the method for producing a composite.

Details to be described later regarding the energy storage device of the present invention may be the same as those regarding a general known electrochemical energy storage devices. The electrochemical energy storage device may refer to any device that stores energy electrochemically, and may be, for example, a supercapacitor or a lithium ion battery.

The energy storage device of the present invention may include, for example, an anode. The anode may include, for example, an anode slurry layer and/or an anode current collector.

The anode slurry layer may include, for example, the composite described above.

The anode slurry layer may further include, for example, a binder. As the binder, at least one selected from the group consisting of carboxymethyl cellulose (CMC), polyvinyl alcohol (PVA), polyvinyliene fluoride (PVDF), polyvinylpyrrolidone (PVP) and methyl cellulose (MC) may be used, without being limited thereto, and a known binder may be appropriately selected as long as it does not impair the properties of the energy storage device.

In addition, the anode slurry layer may further include, for example, N-methyl-2-pyrrolidone (NMP).

In addition, the anode slurry layer may further include, for example, known materials that may be included in the anode slurry layer, such as a conductive material.

In one embodiment, the anode slurry layer may be applied to one or both surfaces of the current collector. In one embodiment, the anode slurry layer may be applied in a loading amount of 0.1 mg/cm$^2$ to 100 mg/cm$^2$. In another embodiment, the loading amount of the anode slurry layer may be 0.2 mg/cm$^2$ or more, 0.3 mg/cm$^2$ or more, 0.4 mg/cm$^2$ or more, 0.5 mg/cm$^2$ or more, 0.6 mg/cm$^2$ or more, 0.7 mg/cm$^2$ or more, 0.8 mg/cm$^2$ or more, 0.9 mg/cm$^2$ or more, or 1.0 mg/cm$^2$ or more, or 90 mg/cm$^2$ or less, 80 mg/cm$^2$ or less, 70 mg/cm$^2$ or less, 60 mg/cm$^2$ or less, 50 mg/cm$^2$ or less, 40 mg/cm$^2$ or less, 30 mg/cm$^2$ or less, 20 mg/cm² or less, 10 mg/cm² or less, 9 mg/cm² or less, 8 mg/cm² or less, 7 mg/cm² or less, 6 mg/cm² or less, 5 mg/cm² or less, 4.5 mg/cm² or less, 4.0 mg/cm² or less, 3.5 mg/cm² or less, 3.0 mg/cm² or less, 2.5 mg/cm² or less, or 2.0 mg/cm² or less.

In one embodiment, the thickness of the anode slurry layer may in the range of 1 μm to 500 μm. In another embodiment, the thickness of the anode slurry layer may 5 μm or more, 10 μm or more, or 15 μm or more, or 450 μm or less, 400 μm or less, 350 μm or less, 300 μm or less, 250 μm or less, 200 μm or less, 150 μm or less, 100 μm or less, 90 μm or less, 80 μm or less, 70 μm or less, 60 μm or less, 50 μm or less, 40 μm or less, or 30 μm or less.

The anode current collector may be composed of, for example, copper, stainless steel, aluminum, nickel, titanium, calcined carbon, or copper or stainless steel surface-treated with carbon, nickel, titanium or silver, etc. The current collector may have fine irregularities formed on the surface thereto to increase the adhesion of the anode active material thereto, and may be in various forms such as a film, a sheet, a foil, a net, a porous body, a foam, or a non-woven body.

The energy storage device of the present invention may include, for example, a cathode. The cathode may include, for example, lithium metal. In addition, details regarding the cathode may be the same as those regarding cathode that may be used in energy storage devices.

The energy storage device of the present invention may further include, for example, a separator (however, the separator may not be included when the electrolyte is a polymer electrolyte or the like). The separator may be composed of uniaxial and/or biaxial polypropylene, polyethylene and/or polyolefin, without being limited thereto, and a known separator may be appropriately selected and used. The thickness of the separator may be in the range of 1 μm to 100 μm, without being limited thereto.

The energy storage device of the present invention may further include, for example, an electrolyte solution. The electrolyte solution may include an electrolyte as a salt component, as well as an organic solvent. The electrolyte may include at least one selected from the group consisting of $LiPF_6$, LiBr, $LiBF_4$, and Li (TFSI). In addition, the organic solvent used in the electrolyte solution may be, for example, one or a mixture of two or more selected from the group consisting of ethylene carbonate (EC), diethyl carbonate (DEC), dimethyl carbonate (DMC), propylene carbonate (PC), sulfolane, acetonitrile, dimethoxyethane, tetrahydrofuran, and ethylmethyl carbonate (EMC). However, the electrolyte solution is not limited to those described above, and various electrolyte solutions known at the time of filing the present invention may be employed.

Hereinafter, examples of the present application will be described in detail, but it is to be understood that the scope of the present invention is not limited to these examples and includes these examples.

Example 1. Production of Composite

First, 0.233 g of $NH_4VO_3$ (1.00 equiv., ≥99%, Sigma-Aldrich), 0.383 g of citric acid (1.00 equiv., ≥99.5%, Sigma-Aldrich), 0.495 g of ethylene glycol (4.00 equiv., 99%, Wako pure chemical industries) and 0.143 g of LiOH (3.00 equiv., ≥98%, Sigma-Aldrich) were dissolved in 20 ml of deionized water. The obtained orange solution was characterized by the presence of $V^{5+}$ species.

Thereafter, 0.181 g of MWCNTs were added to the solution and dispersed by stirring to obtain a mixture. The mixture was dried at 120° C. under vacuum for 12 hours to obtain powder composed of LVO, MWCNTs and a polymer. The MWCNTs used here were multi-walled carbon nanotubes having a diameter of 5 to 7 nm, a length of 50 to 150 μm, and a specific surface area of 500 to 700 m²/g, and were purchased from JEIO (Korea).

Then, the powder was calcined at 300° C. under an air atmosphere for 3 hours to remove the polymer and cooled to room temperature, followed by annealing at 800° C. for 30 minutes under an $N_2$ atmosphere.

As a result, an LVO/C/CNT composite could be obtained.

Comparative Example 1. LVO

An LVO/C composite was produced in the same manner as in Example 1, except that MWCNTs were not added.

Evaluation Example 1. Scanning Electron Microscopy (SEM)

An SEM image was acquired in a known manner using a HITACHI S-4800 instrument. As a result, as shown in FIG. 1, it could be confirmed that the LVO/C/CNT composite showed a form in which the carbon-coated LVO particles were connected to the CNTs, and the average diameter of the LVO particles was about 50 nm.

Evaluation Example 2. Transmission Electron Microscopy (TEM)

TEM images were obtained using a Talos F200X instrument. As a result, as shown in FIG. 2, it could be confirmed that the LVO/C/CNT composite showed a form in which LVO nanoparticles having an average diameter of 50 nm or less were dispersed on the CNT composite.

Evaluation Example 3. X-Ray Diffraction (XRD) Analysis

XRD patterns were recorded from 10° to 80° at 0.1° degree intervals using a SmartLab High Temp/Rigaku diffractometer with an operating wavelength of 1.51 Å. As a result, as shown in FIG. 3, it could be confirmed that both the LVO/C/CNT composite and the LVO/C composite had peaks consistent with the peak positions of LVO. Meanwhile, it could be seen that, the LVO/C/CNT composite had a broad peak at 2–theta=23 (deg), suggesting that it was synthesized in the form of LVO/C/CNT in which LVO was coated with carbon.

Evaluation Example 4. $N_2$ Adsorption-Desorption Isotherm and BET Specific Surface Area To calculate the specific surface area from BET analysis, the $N_2$ adsorption-desorption isotherm was measured at 77K.

After the LVO/C/CNT composite was pretreated at a temperature of 100° C. under vacuum for 10 hours, the $N_2$ adsorption-desorption isotherm thereof depending on $P/P_0$ was measured using the Micromeritics' 2Flex instrument. The results are shown in FIG. 4.

From the results in FIG. 4, it could be confirmed that the specific surface area(BET analysis) of the LVO/C/CNT composite was 236 m²/g.

Evaluation Example 5. Nonlocal Density Functional Theory (NLDFT)

The pore size distribution was measured by the NLDFT method. As a result, the graph as shown in FIG. 5 was obtained. From the graph in FIG. 5, it could be seen that LVO/C/CNTs had an average pore size of 6.4 nm.

Evaluation Example 6. Thermogravimetric Analysis

The content (wt %) of each component in the LVO/C/CNT composite was measured using a thermogravimetric analyzer (NETZSCH, TG209 F1 Libra). Thermogravimetric analysis was performed in the temperature range of 100 to 800° C. at a heating rate of 10° C./min in air.

As a result, the graph as shown in FIG. 6 was obtained, and from the graph, it could be seen that the LVO/C/CNT composite contained 22 wt % of carbon and 78 wt % of LVO.

Example 2. Fabrication of Coin Cell

The LVO/C/CNT composite produced in Example 1 and polyvinylidene difluoride (PVDF) at a weight ratio of 90:10 (composite:PVDF) were added to N-methyl pyrrolidone (NMP) and mixed together. Then, a copper foil was coated with the mixture which was then dried for 12 hours at a temperature of 100° C. under vacuum to obtain a working electrode having a thickness of 20 μm and a loading amount of 1.0 to 2.0 mg/cm$^2$.

A lithium metal was used not only as a counter electrode but also a reference electrode. As an electrolyte, a 1.0 M solution of LiPF$_6$ in EC/DEC (EC: DEC=50:50 volume ratio) (Sigma-Aldrich) was used, and as a separator, a 25-μm-thick polypropylene (PP) film (Celgard2400) was used.

A 2032-type coin cell was fabricated according to a known method using the anode, the cathode, the electrolyte, and the separator.

Comparative Example 2. Fabrication of Coin Cell

A 2032-type coin cell was fabricated in the same manner as in Example 2, except that the LVO/C composite was used instead of the LVO/C/CNT composite.

Evaluation Example 7. Galvanostatic Charge and Discharge Characteristics

Galvanostatic charge and discharge characteristics were evaluated in a known manner using a MACCOR Series 4000 tester in the voltage range of 0.1 to 3.0 V while varying the current density within the range of 0.02 A/g to 20 A/g.

As a result, as shown in FIG. 7, it could be confirmed that Example 2 (expressed as w/CNT) showed a higher specific capacity that of Comparative Example 2 (expressed as w/o CNT) in the above-described current density range.

As described above, according to the present invention, it is possible to provide a nano-sized composite having excellent electrical conductivity and specific surface area.

According to the present invention, it is possible to provide a method of producing the above-described composite through a simple process without an ultracentrifugation process or a flash annealing step.

According to the present invention, it is possible to provide an energy storage device having high power performance and having excellent specific capacity characteristics not only at low current density but also at high current density.

What is claimed is:

1. A composite comprising lithium-vanadium oxide, amorphous carbon, and carbon nanotubes, wherein the composite has a specific surface area (BET analysis) ranging from 150 to 500 m$^2$/g;

wherein the carbon nanotubes have a BET specific surface area ranging from 350 to 1,000 m$^2$/g; and wherein the carbon nanotubes have a length of 10 to 1,500 μm.

2. The composite of claim 1, having an average pore size ranging from 1 nm to 100 nm.

3. The composite of claim 1, wherein the lithium-vanadium oxide has an average particle diameter of 500 nm or less.

4. The composite of claim 1, wherein the carbon nanotubes have a BET specific surface area ranging from 500 to 1,000 m$^2$/g.

5. The composite of claim 1, wherein the carbon nanotubes have a diameter ranging from 1 to 50 nm.

6. The composite of claim 1, wherein the carbon nanotubes have a length of 50 to 1,500 μm.

7. The composite of claim 1, comprising the lithium-vanadium oxide in an amount of 5 wt % or more based on the total weight of the composite.

8. An energy storage device comprising the composite of claim 1.

TABLE 1

| Current density (A/g) | | 0.02 | 0.1 | 0.2 | 0.4 | 1 | 5 | 10 | 15 | 20 |
|---|---|---|---|---|---|---|---|---|---|---|
| C-rate | w/CNT | 0.05 C | 0.27 C | 0.57 C | 1.25 C | 3.6 C | 28 C | 97 C | 257 C | 480 C |
| | w/o CNT | 0.08 C | 0.48 C | 1.06 C | 2.41 C | 7.42 C | 76.6 C | 360 C | 900 C | 1800 C |

In addition, as shown in Table 1, it could be seen that Example 2 had a specific capacity of 460 mAh/g at a low current density of 0.02 A/g, and had a specific capacity of 40 mAh/g (capacity retention rate: 8.7%) for a short time of 7.5 seconds even at a high current density of 20 A/g.

9. The composite of claim 1, wherein the composite has a specific surface area (BET analysis) ranging from 200 to 500 m$^2$/g.

* * * * *